US011512753B2

(12) United States Patent
Mühlegger

(10) Patent No.: US 11,512,753 B2
(45) Date of Patent: Nov. 29, 2022

(54) FRICTION LINING

(71) Applicant: Miba Frictec GmbH, Laakirchen (AT)

(72) Inventor: Markus Mühlegger, Pinsdorf (AT)

(73) Assignee: Miba Frictec GmbH, Laakirchen (AT)

( * ) Notice: Subject to any disclaimer, the term of this patent is extended or adjusted under 35 U.S.C. 154(b) by 362 days.

(21) Appl. No.: 16/818,305

(22) Filed: Mar. 13, 2020

(65) Prior Publication Data

US 2020/0292021 A1  Sep. 17, 2020

(30) Foreign Application Priority Data

Mar. 13, 2019 (AT) ................. A50220/2019

(51) Int. Cl.
*F16D 69/02* (2006.01)

(52) U.S. Cl.
CPC ...... *F16D 69/02* (2013.01); *F16D 2200/0052* (2013.01)

(58) Field of Classification Search
CPC .. F16D 69/02; F16D 69/00; F16D 2200/0052; F16D 2069/002; F16D 2069/005
See application file for complete search history.

(56) References Cited

U.S. PATENT DOCUMENTS

| | | | |
|---|---|---|---|
| 5,339,931 A | 8/1994 | Jacko et al. | |
| 5,433,774 A * | 7/1995 | Kapl | F16D 69/027 106/36 |
| 8,096,396 B2 * | 1/2012 | Muhlegger | F16D 69/027 188/251 M |
| 10,161,461 B2 * | 12/2018 | Kim | F16D 69/02 |
| 10,487,251 B2 * | 11/2019 | Kamei | C22C 32/0005 |
| 10,655,687 B2 * | 5/2020 | Kim | D21H 17/68 |
| 2009/0236191 A1 | 9/2009 | Mayrhofer | |
| 2010/0043303 A1 | 2/2010 | Webb | |
| 2014/0109723 A1 | 4/2014 | Ishimoto et al. | |
| 2015/0323028 A1 * | 11/2015 | Canuti | F16D 69/028 523/156 |
| 2018/0058512 A1 * | 3/2018 | Kim | F16D 69/02 |
| 2018/0306263 A1 | 10/2018 | Kienleitner et al. | |
| 2019/0085909 A1 * | 3/2019 | Kim | F16D 69/026 |
| 2019/0292634 A1 * | 9/2019 | Kubota | F16D 69/027 |
| 2020/0038959 A1 * | 2/2020 | Kubota | B22F 7/008 |
| 2022/0112930 A1 * | 4/2022 | Muehlegger | F16D 69/027 |

FOREIGN PATENT DOCUMENTS

| | | |
|---|---|---|
| CN | 103459626 A | 12/2013 |
| DE | 2924540 A1 | 1/1980 |
| DE | 4443666 A1 | 6/1996 |
| EP | 2012038 A2 | 1/2009 |
| JP | S60106932 A | 6/1985 |
| JP | H09003564 A | 1/1997 |
| WO | 2018185944 A1 | 10/2018 |

* cited by examiner

*Primary Examiner* — Thomas W Irvin

(74) *Attorney, Agent, or Firm* — Stoel Rives LLP

(57) ABSTRACT

Embodiments of the disclosure relate to a binder-free, sintered friction lining, for a friction component of a friction assembly, having a friction lining body, which comprises a metallic matrix, at least one abrasive, solid lubricants, and optionally at least one filling material, wherein the solid lubricants are formed by at least two different solid lubricants, which are selected from a group consisting of hexagonal boron nitride and metal sulfides with at least one metal from the group of tungsten, iron, tin, copper, bismuth, antimony, chromium, zinc, silver, manganese, molybdenum.

14 Claims, 3 Drawing Sheets

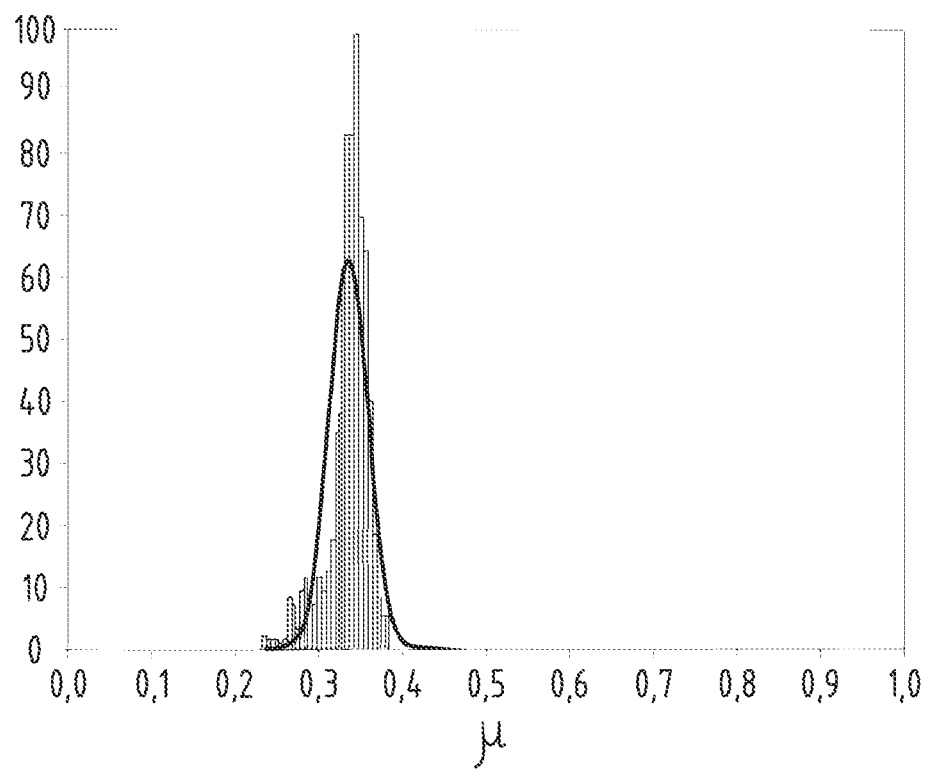

FRICTION LINING

RELATED APPLICATION

This application claims priority of Austrian Patent Application No. A50220/2019, filed Mar. 13, 2019, which is incorporated by reference in its entirety.

BACKGROUND

In common, dry-running drive systems of motor vehicles, resin-bonded friction linings are used. For example, DE2924540A describes a product for manufacturing components with metallic compositions, the product being formed by at least one steel fiber powder. This fibrous powder is used for a friction lining for brakes in a proportion of 30 to 85 wt. %. The friction lining contains between 10 and 20% polymer-based phenolic binder.

These materials are characterized by a low tendency to frictional vibrations (e.g. clutch grabbing) but can only be used at very low temperature and energy loads, mainly due to the matrix raw materials used, i.e. the resin.

Modern drive trains should be able to transmit higher power at a lower and lower weight, while at the same time increasing driving comfort and fuel efficiency. Due to a requirement of keeping the weight of the vehicle as low as possible, the frame size of clutches is strongly restricted. This, in turn, has a strong effect on the loads on the friction lining, since small installation space for the clutch means smaller lining surfaces, which can result in higher energy and temperature loads of the friction material.

The known metallic friction linings, in turn, may have a very high energy and thermal load capacity, high friction coefficients and low abrasion, but also a very strong tendency to frictional vibrations, which can affect the entire drive train and thus have a very negative effect on the driving comfort of the vehicle.

The prior art further describes friction components in which the friction lining is formed by sintered materials. For example, DE4443666A describes a component with friction surfaces for friction synchronization in manual transmissions of motor vehicles. The friction surface material of the component described in DE4443666A is a sintered bronze substantially pore-free on the surface with metallic and non-metallic additives, which increase the friction behavior, wear resistance and shifting comfort, in the form of up to 6 wt. % zinc, up to 6 wt. % nickel, up to 3 wt. % molybdenum, 1 to 6 wt. % $SiO_2$ and/or $Al_2O_3$, optionally 0.2 to 6 wt. % graphite and/or molybdenum disulfide, wherein the remainder is formed by bronze at a defined particle size in the initial powder. This sintered bronze is provided for oil-lubricates parts for friction synchronization in manual transmissions of motor vehicles.

DE3232865A describes a method for manufacturing a friction element for a motor car or a motor cycle disc brake. As the material for the friction lining, powders of copper, tin, lead and graphite, silicon oxide, aluminum oxide and molybdenum disulfide are used. Hence, differently porous friction linings can be manufactured, the final density of which is in the range between 72.6% and 90.5%.

EP2012038A2 describes a binder-free sintered dry-running friction lining with a friction lining body having a metallic matrix, at least one abrasive and at least one filling material, wherein the friction lining body has a porosity if greater than 10% and wherein the proportion of the at least one abrasive in the friction lining body amounts to a maximum of 5 wt. %. In the metallic matrix, at least one solid lubricant can be contained which is selected from a group comprising graphite, molybdenum disulfide, coke, as well as mixtures thereof.

SUMMARY OF THE DISCLOSURE

Embodiments of this disclosure relate to a binder-free, sintered friction lining having a friction lining body, which may include a metallic matrix, at least one abrasive, solid lubricants, and optionally at least one filling material.

Embodiments of the disclosure further relate to a friction component having a carrier on which a friction lining is arranged.

Moreover, embodiments of the disclosure relate to a friction assembly, such as a clutch or a brake, with at least one friction component.

Solid lubricants used in embodiments of friction lining bodies according to the present disclosure may be formed by at least two different solid lubricants, which are selected from a group consisting of hexagonal boron nitride and metal sulfides with at least one metal from the group of tungsten, iron, tin, copper, bismuth, antimony, chromium, zinc, silver, manganese, molybdenum. Each one of these solid lubricants may have correspondingly good properties in specific operating ranges. Hence, the friction lining can be better adapted to a comprehensive load spectrum. The friction lining can therefore be more suitable for dry running, i.e. for operating conditions without the dissipation of the emerging frictional heat with an oil. This in turn may reduce the drag torques that can be generated due to the use of oil. Hence, the friction assembly may be built with a small distance of the friction components to one another, whereby the constructional volume of the friction component can be reduced. Friction linings consistent with the present disclosure may therefore have a significantly improved friction behavior. The improvement can relate to the reduction of vibrations during the frictional engagement of the friction lining with a counter friction surface, whereby in further consequence a stabilization of the friction process and hence a reduction of premature wear of the friction lining can be achieved.

According to some embodiments, for friction lining, it can be provided for that solid lubricants are formed by at least two metal sulfides comprising the same metal. Thus, mixed sulfides can be used in which the metal is contained in at least two different oxidation stages. Thus, the temperature behavior of the friction lining can be further improved. However, the material compatibility of the individual ingredients of the friction lining's composition can also be improved by using tin sulfides as solid lubricants, for example, if the friction lining also contains tin or intermetallic tin compounds.

For further improvement of the long-term temperature resistance, it can be provided for that the solid lubricant composition additionally contains graphite according to another embodiment variant of the friction lining.

In the course of tests carried out, it has been found that it can be advantageous if the total proportion of solid lubricants in the friction lining body is selected from a range of 5 wt. % to 30 wt. %, since for proportions of solid lubricants in this range the aforementioned effects may be particularly strong.

On the basis of the tests mentioned, it was further found that it can be advantageous if the friction lining of this disclosure is designed according to at least one of the following embodiment variants:

the friction lining body contains tin sulfides as solid lubricants, wherein the total proportion of tin sulfides in the friction lining body amounts to between 2 wt-% and 7 wt. %; and/or the friction lining body contains iron sulfides as solid lubricants, wherein the total proportion of iron sulfides in the friction lining body amounts to between 1 wt-% and 5 wt. %; and/or the friction lining body contains hexagonal boron nitride as solid lubricant, wherein the total proportion of hexagonal boron nitride in the friction lining body amounts to between 1 wt-% and 6 wt. %; and/or the friction lining body contains graphite and hexagonal boron nitride as solid lubricants, wherein a ratio of graphite to hexagonal boron nitride is selected from a range of 3 to 6; and/or the solid lubricants are partly of natural origin and partly manufactured synthetically, wherein a ratio of natural solid lubricant to synthetic solid lubricant is selected from a range of 1.5 to 5; and/or the proportion of synthetically produced solid lubricants in the friction lining body amounts to between 0.5 wt. % and 5 wt. %; and/or the friction lining body contains SnS and $SnS_2$ as solid lubricants, wherein the proportion of SnS in the friction lining body amounts to between 2 wt. % and 6 wt. % and the proportion of $SnS_2$ in the friction lining body amounts to between 1 wt. % and 5 wt. %; and/or the friction lining body contains SnS, $SnS_2$, $Sn_2S_3$ and hexagonal boron nitride as solid lubricants, wherein the proportion of SnS in the friction lining body amounts to between 0.5 wt. % and 1.5 wt. %, the proportion of $SnS_2$ in the friction lining body amounts to between 1 wt. % and 3 wt. %, the proportion of $Sn_2S_3$ in the friction lining body amounts to between 0.5 wt. % and 3 wt. % and the proportion of hexagonal boron nitride in the friction lining body amounts to between 3.5 wt. % and 7.5 wt. %; and/or the friction lining body contains SnS and FeS as solid lubricants, wherein the proportion of SnS in the friction lining body amounts to between 6 wt. % and 10 wt. % and the proportion of FeS in the friction lining body amounts to between 2 wt. % and 6 wt. %; and/or the friction lining body contains SnS, FeS and a synthetic solid lubricant based on zinc sulfide with tungsten sulfide and with graphite as solid lubricants, wherein the proportion of SnS in the friction lining body amounts to between 1 wt. % and 5 wt. %, the proportion of FeS in the friction lining body amounts to between 2 wt. % and 6 wt. % and the proportion of synthetic solid lubricant amounts to between 0.5 wt. % and 1 wt. %, and/or the friction lining body contains SnS, FeS, hexagonal boron nitride and a synthetic solid lubricant based on zinc sulfide with tungsten sulfide and with graphite as solid lubricants, wherein the proportion of SnS in the friction lining body amounts to between 2 wt. % and 6 wt. %, the proportion of FeS in the friction lining body amounts to between 1 wt. % and 3.5 wt. %, the proportion of hexagonal boron nitride in the friction lining body amounts to between 0.5 wt. % and 4 wt. % and the proportion of synthetic solid lubricant amounts to between 0.5 wt. % and 3 wt. %, and/or the friction lining body contains SnS, hexagonal boron nitride, graphite and a synthetic solid lubricant based on zinc sulfide with tungsten sulfide and with graphite as solid lubricants, wherein the proportion of SnS in the friction lining body amounts to between 4 wt. % and 8 wt. %, the proportion of hexagonal boron nitride in the friction lining body amounts to between 2 wt. % and 6 wt. %, the proportion of graphite in the friction lining body amounts to between 10 wt. % and 17 wt. % and the proportion of synthetic solid lubricant amounts to between 0.5 wt. % and 3 wt. %.

Embodiments of the disclosure may include a friction lining and/or a friction element with low frictional vibration which can be subjected to a relatively high temperature load.

Embodiments of the disclosure include a friction component comprising the friction lining of the disclosure.

Embodiments of the disclosure include a friction assembly comprising at least one friction component of the disclosure.

Additional aspects and advantages will be apparent from the following detailed description of embodiments, which proceeds with reference to the accompanying drawings.

BRIEF DESCRIPTION OF THE DRAWINGS

FIG. 5 shows a representation of the friction coefficient accuracy of a friction lining according to embodiments of the disclosure.

DETAILED DESCRIPTION OF PREFERRED EMBODIMENTS

In the embodiments described, the same parts are provided with the same reference numbers and/or same component designations, where the disclosures contained in the entire description may be analogously transferred to same parts with same reference numbers and/or the same component designations. Moreover, the specifications of location, such as at the top, at the bottom, at the side, chosen in the description refer to the directly described and depicted figure and in case of a change of position, these specifications of location are to be analogously transferred to the new position.

All standards referred to in this description refer to the latest version valid at the date of filing of the present application, unless otherwise stated.

Figure 1:
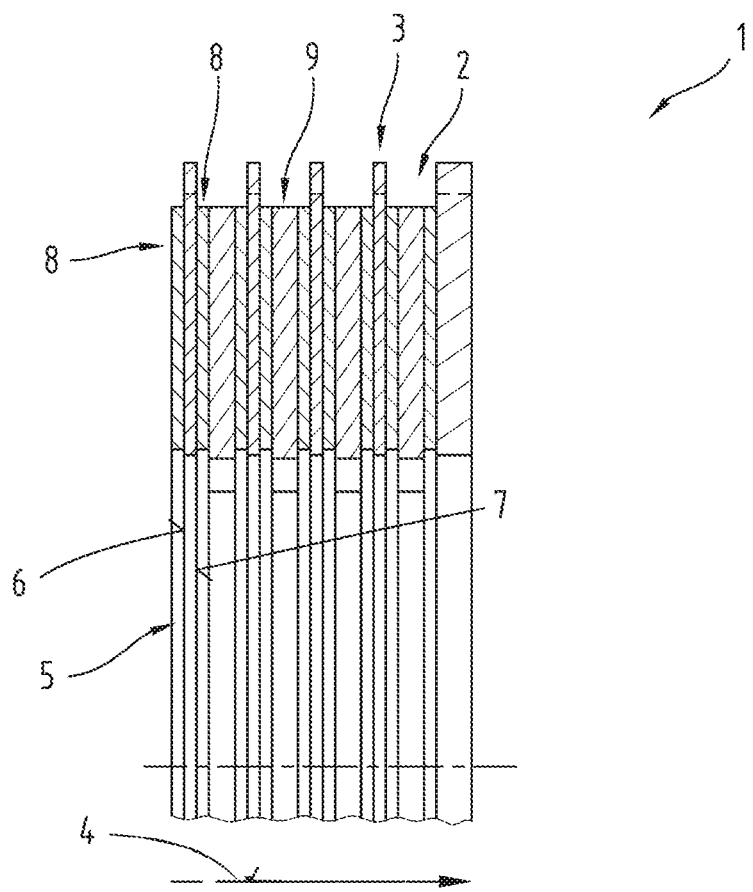
FIG. 1 shows a cutout from a disc pack of a friction assembly.

FIG. 1 shows a disc pack 1 of a friction assembly not shown in further detail. The disc pack 1 comprises at least one lining disc 2, or several lining discs 2, and at least one counter disc 3, or several counter discs 3, which can also be referred to as friction discs. The lining discs 2 are arranged in an axial direction 4 one behind the other, alternating with the counter plates 3. Via a corresponding confirmation mechanism, the lining discs 2 are adjustable relative to the counter discs 3 in the axial direction 4, such that a frictional engagement is established between the lining discs 2 and the counter discs 3.

In some embodiments, the lining discs 2 are designed as so-called outer discs and the counter discs 3 as so-called inner discs. However, the formation of these can also be the other way around, such that the lining discs 2 form the inner discs and the counter discs 3 form outer discs.

Figure 2:
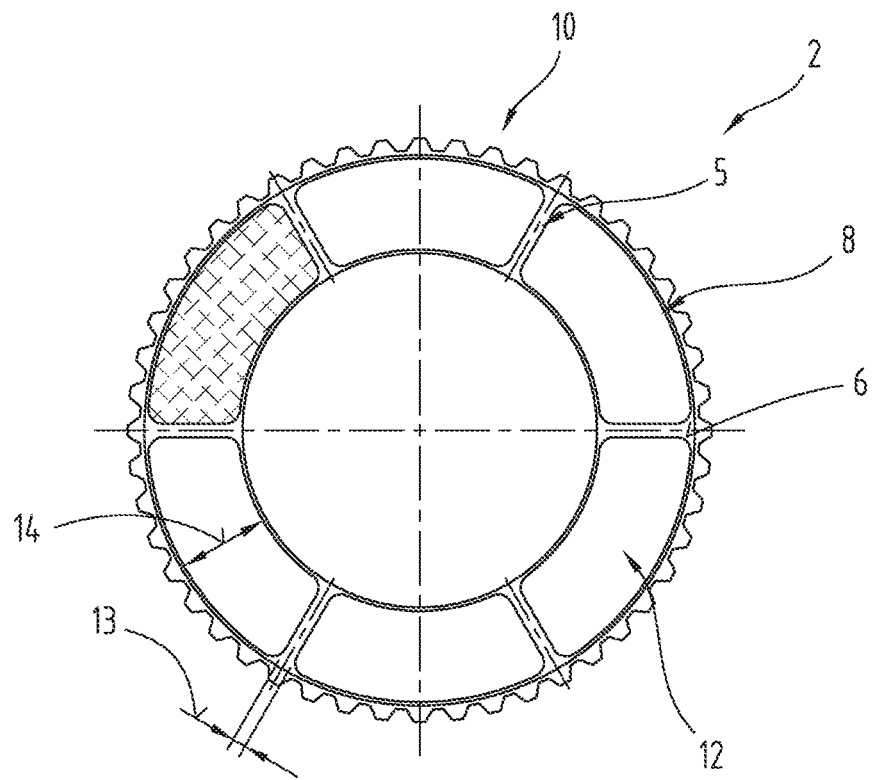
FIG. 2 shows a friction disc.
Figure 3:
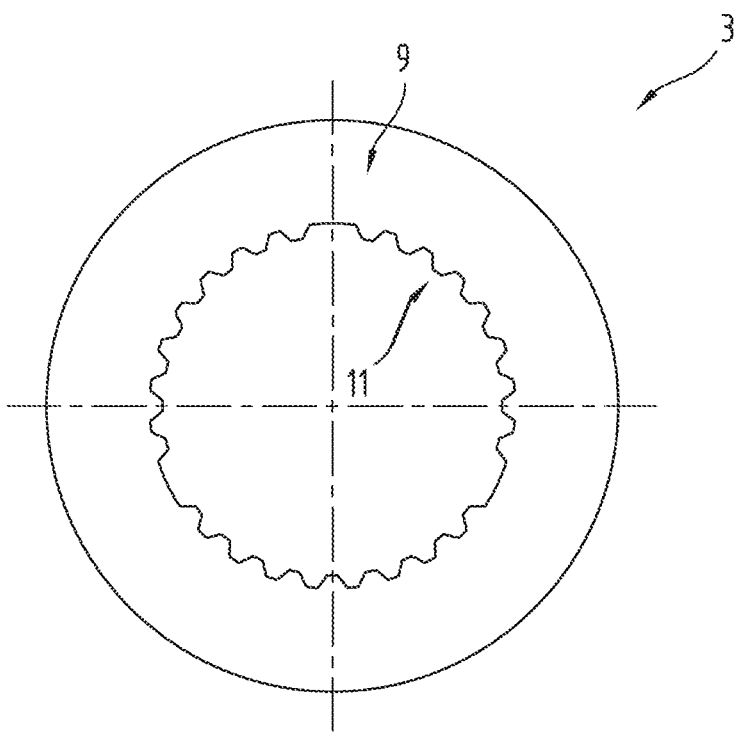
FIG. 3 shows a counter disc.

The lining disc 2 can better be seen from FIG. 2 and the counter disc 3 can better be seen from FIG. 3. Since all lining discs 2 and/or all counter discs 3 of a disc pack 1 and/or of a friction assembly are preferably designed equally, below, merely one lining disc 2 and one counter disc 3 are elaborated on. These statements can correspondingly be applied to lining discs 2 and/or counter discs 3. The number of the lining discs 2 and the counter discs 3 can in general for example be selected from a range of 1, or 2, to 20 in each case. Accordingly, the number of lining and counter discs 2, 3 shown in FIG. 1 is not to be understood as limiting.

The lining discs 2 comprise an at least approximately angular carrier disc 5 with a first surface 6 and a second surface 7 opposite thereto the axial direction 4. On the first and/or on the second surface 6, 7, in each case, at least one friction lining 8 is arranged. The counter disc 3 comprises an at least approximately angular disc body 9, which is, however, free of friction linings.

The lining discs 2 comprise at least one driver element 10, for example in the form of an external toothing, on a radially outer end face. Likewise, the counter discs 3 comprise at least one driver element 11 on a radially inner end face. Via the driver elements 10, 11, a connection preventing rotation relative to another component of the friction assembly can be established, for example of a shaft in case of the counter discs 2 or of the housing of the friction assembly in case of the lining discs 3. It should again be pointed out that the discs can be of reversed design, i.e. the lining discs 2 can comprise the driver elements 11 and the counter discs 3 can comprise the driver elements 10, and accordingly the rotationally fixed connection with the respective other component of the friction assembly can also be established.

This general structure of a disc pack is known from the prior art. As regards further details, reference is thus made to the relevant prior art. The disc pack 1 is preferably part of a dry-running disc friction system, such as a dry-running disc clutch, a brake, a holding brake, a differential lock, etc. Preferably, the disc pack 1 is used in a friction assembly of an AWD drive (All Wheel Drive) or an FWD drive (Front Wheel Drive). However, it should be noted that the friction lining 8 can also be used in other friction assemblies not having friction discs. The friction lining 8 can, however, also be arranged on a carrier in these applications and form a friction component therewith.

The friction lining 8 preferably is a mass-pressed dry running friction lining. For this purpose, a mixture can be produced from the components of friction lining 8, which is then pressed into a pellet in a press, optionally in a hot press at an elevated temperature (e.g. at a temperature between 100° C. and 190° C.).

According to an embodiment, it can be provided for that the friction lining 8 is a press sintered friction lining. The press sintered friction lining can be a sintered metal lining. The friction lining 8 can be manufactured by means of a band sintering process or by means of pressure sintering or by means of a DHP process (Direct Hot Pressing). The friction lining 8 can have a layer thickness of between 0.5 mm and 5 mm.

As already mentioned, the friction lining 8 is preferably arranged on the carrier disc 5. The carrier disc 5 preferably consists of a steel. However, other iron-based alloys can also be used. Likewise, copper-based alloys, such as brass or bronze, or other metallic alloys can also be used. The carrier disc 5 can have a thickness of between 0.4 mm and 5.5 mm.

The friction lining 8 can be arranged directly on the carrier disc 5, for example be pressed onto it or sintered onto it. However, it is also possible that the friction lining 8 is connected to the disc carrier 5 via a connecting layer, which is arranged between the disc carrier 5 and the friction lining 8. The connecting layer can for example be a layer of solder, e.g. a brazing solder based on a CuSn or CuZn alloy, or an adhesive layer, e.g. of organic and inorganic high-temperature adhesive.

The carrier disc 5 can also comprise at least one friction lining 8 on just one of the surfaces 6, 7 or on both surfaces 6, 7 (as shown in FIG. 1). It is also possible that the friction lining 8 is designed as a closed, one-piece ring, i.e. extends continuously over 360°. According to another embodiment, however, it can also be provided for that the friction lining 8 is segmented, as shown in FIG. 2. A friction lining 8 with six segments 12 is shown. However, this number is not to be considered restricting. The friction lining 8 can have between two and thirty segments 8. A friction component can, however, also comprise just one such segment 8, which is not designed as a closed ring. Other forms of the friction lining are also possible, e.g. cylindrical, cuboid, etc.

The segments 8 are arranged to be spaced apart from one another in the circumferential direction of the friction disc 8. In this regard, a distance 13 can amount to between 0 mm and 20 mm, or between 1 mm and 15 mm.

Edges and/or rims of the segments 12 and/or the friction linings 8 can be designed to be slanted or rounded. In this regard, the rounding radius can amount to between 0.5 mm and 6 mm, or between 1 mm and 4.5 mm. A radial width 14 of the friction lining 8 and/or the segments 12 can be selected from a range between 5 mm to 40 mm. The grooves created between segments 12 by the spacing of the segments 12 can have a rectangular, square, trapezoidal, round, etc. cross section.

The counter disc 3 preferably consists of a steel. However, other iron-based alloys can also be used. Likewise, copper-based alloys, such as brass or bronze, or other metallic alloys can also be used.

The counter disc 3 can have a thickness of between 0.5 mm and 6 mm. The outer diameter and the inner diameter of the lining discs 2 and the counter discs 3 can be adjusted to the corresponding circumstances. The same applies to the ratio of outer diameter to inner diameter.

It can further be provided for according to another embodiment, the surface of the friction lining 8 is designed to be structured, as is represented in dashed lines in FIG. 2. The structuring can be designed in the form of grooves, for example grooves with concentric or radial extent, grooves in the shape of a trapezoidal pattern, as waffle grooves, etc. Discrete elevations in the form of knobs or the like are also possible as surface structuring. The surface of the friction lining 8 can, however, also be designed to be pressed smooth.

The depth of the grooves of the surface structure(s) can be selected from a range of 0.1 mm to 2 mm, or between 0.5 mm and 1.5 mm. The width of the grooves (in the circumferential direction of the friction disc 8) can be selected from a range of 1 mm to 3 mm, or between 1 mm and 2.5 mm. The grooves can have a rectangular, square, trapezoidal, round, etc. cross section. All grooves of a surface structure can be designed equally. However, it is also possible that different grooves (width, depth, shape) are combined with one another in one surface.

The friction lining 8 can have a porosity larger than 10%. The friction lining can have a porosity selected from a range having a lower limit of 15% and an upper limit of 40%. In this regard, the porosity refers to the relative proportion of the cavity volume in the total volume of the friction lining 8. The porosity can be measured by Hg intrusion and extrusion: Pore volume according to ISO 15901-1 (DIN 66133).

For further improvement of the properties of the friction lining 8, the porosity can also be selected from a range having a lower limit of 20% and an upper limit of 35%, or selected from a range having a lower limit of 25% and an upper limit of 30%.

The binder-free friction lining 8 comprises a friction lining body. Binder-free means that the friction lining 8 does not comprise organic resins as binders. The friction lining body comprises a metallic matrix, at least one abrasive, solid lubricants, and optionally at least one filling material and/or consists thereof, wherein in the latter case all components of the friction lining body add up to 100 wt. %.

The proportion of the metallic matrix in the friction lining 8 can be selected from a range having a lower limit of 50 wt. % and an upper limit of 90 wt. %. The proportion of the metallic matrix can further be selected from a range having a lower limit of 70 wt. % and an upper limit of 80 wt. %.

Preferably, for the metallic matrix at least one metal or a metal alloy is used, which has/have a hardness according to Vickers selected from a range having a lower limit of 30 HV10 and an upper limit of 80 HV10. By means of metals of this hardness, it is possible that at least a part of the abrasive effect of the friction lining is maintained by the metallic matrix, for example, if the metallic matrix is not post-treated by grinding or the like to smooth the surface.

For the metallic matrix at least one metal or a metal alloy can be used, which has/have a hardness according to Vickers selected from a range having a lower limit of 40 HV10 and an upper limit of 60 HV10. For example, the metallic matrix can be formed from at least one element from a group comprising copper, iron, tin, zinc or alloys therewith and mixtures thereof. Preferably, the proportion of the abrasive in the friction lining 8 amounts to a maximum of 5 wt. %. The at least one abrasive can be selected from a group comprising mullite, silicon dioxide, corundum, glass, aluminum oxide ($Al_2O_3$), as well as mixtures of these, wherein a high abrasive effect can be achieved by these abrasives, even with such low percentages of abrasives.

The proportion of the at least one filling material in the friction lining 8 can be selected from a range having a lower limit of 5 wt. % and an upper limit of 35 wt. %. It is particularly preferred for the filling material to be a silicate filling material, for example, according to an embodiment, selected from a group comprising mica, feldspar, kieselguhr or mixtures thereof. Especially by the last-mentioned particular filling materials in combination with the high porosity, high friction coefficients can be achieved despite small proportions of abrasives.

In the metallic matrix, at least two different solid lubricants are included, which are selected from a group consisting of hexagonal boron nitride and metal sulfides with at least one metal from the group of tungsten, iron, tin, copper, bismuth, antimony, chromium, zinc, silver, manganese, molybdenum. Besides hexagonal boron nitride, the group of solid lubricants can also comprise $Sb_2S_3$, $Bi_2S_3$, $Cr_2S_3$, $Cu_2S$, $CuS$, $CuFeS_2$, $FeS$, $FeS_2$, $MnS$, $MoS_2$, $Ag_2S$, $WS_2$, $SnS$, $SnS_2$, $Sn_2S_3$, $ZnS$. In this regard, it can be provided for that the solid lubricants are formed of at least two metal sulfides comprising the same metal, i.e. for example of SnS and $SnS_2$.

In addition to these solid lubricants, graphite, for example natural graphite or synthetic primary or secondary graphite, coke and mixtures thereof can be included.

It is advantageous if the total proportion of solid lubricants in the metallic matrix is selected from a range having a lower limit of 5 wt. % and an upper limit of 30 wt. %. For example, the total proportion of solid lubricants in the friction lining 8 can be selected from a range having a lower limit of 6 wt-% and an upper limit of 15 wt. % and/or be selected from a range having a lower limit of 8 wt. % and an upper limit of 10 wt. %. Tin sulfides can be included in a total proportion between 2 wt. % and 7 wt. %. The total proportion of iron sulfides in the friction lining body can amount to between 1 wt. % and 5 wt. %. The total proportion of hexagonal boron nitride in the friction lining body can amount to between 1 wt. % and 6 wt. %. If hexagonal boron nitride and graphite are included, the quantity ratio of graphite to hexagonal boron nitride can be selected from a range of 3 to 6.

It can also be provided for that the solid lubricants are partly of a natural original and partly synthetically produced. In this regard, it is advantageous if a quantity ratio of natural solid lubricants to synthetic solid lubricants is selected from a range of 1.5 to 5. In general, the quantitative proportion of synthetic solid lubricants can amount to between 0.5 wt. % and 5 wt. %.

The synthetic solid lubricants are, for example, produced on the basis of graphite and on the basis of metal sulfides and/or synthetic graphite and synthetic metal sulfides from the afore-listed group of metals.

Below, some preferred example of solid lubricant compositions of the friction lining 8 are listed, which, however, so not have a limiting character. All indications regarding the compositions are provided in wt. %.

Example a

2% to 6 SnS+1% to 5% $SnS_2$, for example 4% SnS+3% $SnS_2$.

Example b 0.5% to 1.5% SnS+1% and 3% $SnS_2$+0.5-% and 3% $Sn_2S_3$+3.5% and 7.5% hexagonal boron nitride, for example 1% SnS+2 $SnS_2$+1.5% $Sn_2S_3$+5.5% hexagonal boron nitride.

Example c

6% to 10% SnS+2% and 6% FeS, for example 8% SnS+4% FeS.

Example d

1% to 5% SnS+2% to 6% FeS+0.5% to 1% synthetic solid lubricant based on zinc sulfide with tungsten sulfide and with graphite, for example 3% SnS+4% FeS+0.75% synthetic solid lubricant.

Example e

2% to 6% SnS+1% to 3.5% FeS+0.5% to 4% hexagonal boron nitride+0.5% to 3% synthetic solid lubricant based on zinc sulfide with tungsten sulfide and with graphite, for example 4% SnS+2.5% FeS+2% hexagonal boron nitride+1.5% synthetic solid lubricant.

Example f

4% to 8% SnS+2% to 6% hexagonal boron nitride+10% to 17% graphite+0.5% to 3% synthetic solid lubricant based on zinc sulfide with tungsten sulfide and with graphite, for example 6% SnS+4% hexagonal boron nitride+15% graphite+2% synthetic solid lubricant.

By means of these solid lubricant compositions, the following examples of friction linings 8 were produced; however, these do not have a limiting character. All indications regarding the compositions are also to be understood in wt. %.

Example 1

60.0% copper, 10.0% iron, 15.0% feldspar, 1% SnS+2 $SnS_2$+1.5% $Sn_2S_3$+5.5% hexagonal boron nitride, 5% aluminum oxide.

Example 2

60.0% copper, 2.0% tin, 20.0% kieselguhr, 8% SnS+4% FeS, 2.0% natural graphite, 4.0% corundum.

Example 3

60.0% copper, 14.0% iron, 8.0% mica, 1% SnS+2 $SnS_2$+1.5% $Sn_2S_3$+5.5% hexagonal boron nitride, 3.5% natural graphite, 4.5% aluminum oxide.

Example 4

64.0% copper, 3.0% zinc, 4.0% mica, 6% SnS+4% hexagonal boron nitride+15% graphite+2% synthetic solid lubricant, 2.0% silicon oxide.

Example 5

70.0% copper, 8.0% mica, 10.0% feldspar, 4% SnS+3% $SnS_2$, 5% mullite.

Example 6

70.0% copper, 15.0% iron, 4% SnS+2.5% FeS+2% hexagonal boron nitride+1.5% synthetic solid lubricant, 5% silicon oxide.

Example 7

90.0% copper, 3% SnS+4% FeS+0.75% synthetic solid lubricant, 2.25% mullite.

Example 8

50.0% copper, 9.0% iron, 10.0% kieselguhr, 15.0% mica, 4% SnS+2.5% FeS+2% hexagonal boron nitride+1.5% synthetic solid lubricant, 6% silicon oxide.

Figure 4:
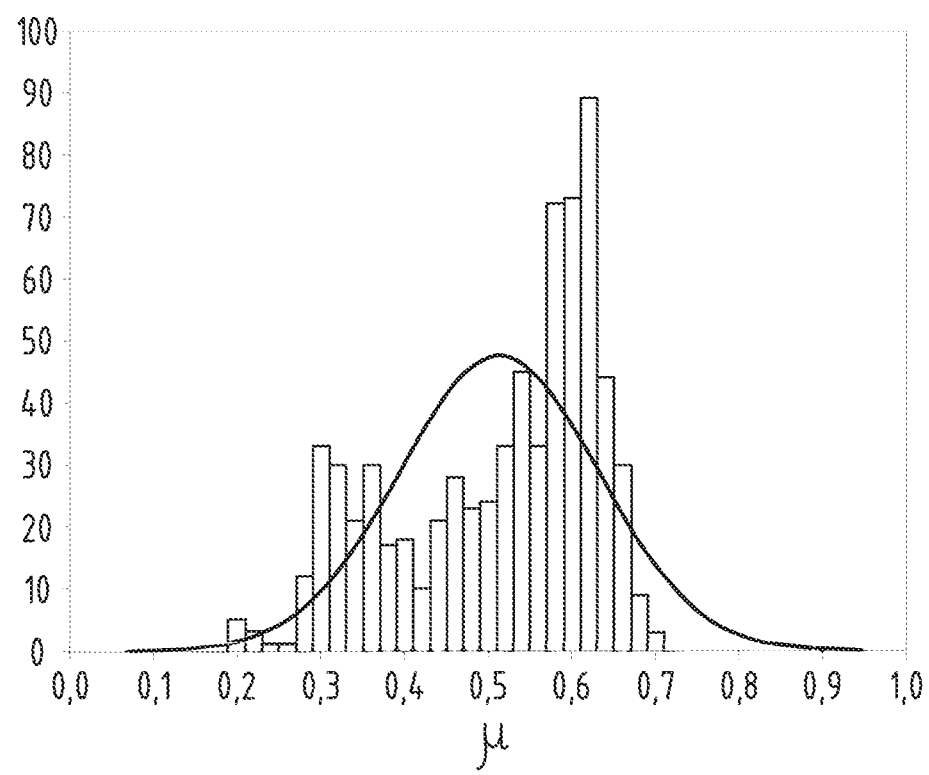
FIG. 4 shows a representation of the friction coefficient accuracy for a friction lining according to the prior art.

In the course of validating Embodiments of the disclosure, inter alia, the friction coefficient accuracy of the friction linings 8 was determined. FIG. 4 shows the distribution of the friction coefficients for friction linings according to EP 2 012 038 A2 and FIG. 5 shows the distribution of the friction coefficients for friction linings 8 according to the present invention. The friction coefficient is shown on the abscissa and the frequency on the ordinate. In each case 708 samples were measured.

As can immediately be seen from the comparison of the two figures, the friction linings 8 according to Embodiments of the disclosure have a significantly higher friction coefficient accuracy.

The present disclosure includes various embodiments which are exemplary, and it should be noted that combinations of embodiments are contemplated, as well as other variants.

As a matter of form, it should be noted that for ease of understanding of the structure of the friction assembly and/or the disc pack 1 and of the discs of this disclosure, these are not obligatorily depicted to scale.

It will be obvious to those having skill in the art that many changes may be made to the details of the above-described embodiments without departing from the underlying principles of the invention. The scope of the present invention should, therefore, be determined only by the following claims.

The invention claimed is:

1. A binder-free, sintered friction lining having a friction lining body, which comprises a metallic matrix, at least one abrasive, solid lubricants, and optionally a filling material, wherein the solid lubricants are formed by at least two different solid lubricants, which are selected from a group consisting of hexagonal boron nitride and metal sulfides with at least one metal from the group of tungsten, iron, tin, copper, bismuth, antimony, chromium, zinc, silver, manganese, and molybdenum, wherein the friction lining body contains SnS and FeS, and the solid lubricants include a synthetic solid lubricant based on zinc sulfide with tungsten sulfide and with graphite, and wherein the proportion of SnS in the friction lining body amounts to between 1 wt. % and 5 wt. %, the proportion of FeS in the friction lining body amounts to between 2 wt. % and 6 wt. %, and the proportion of synthetic solid lubricant in the friction lining body amounts to between 0.5 wt. % and 1 wt. %.

2. The friction lining according to claim 1, wherein the solid lubricants are formed by at least two metal sulfides comprising the same metal.

3. The friction lining according to claim 1, further comprising graphite.

4. The friction lining according to claim 3, wherein the friction lining body contains graphite and hexagonal boron nitride as solid lubricants, wherein a ratio of graphite to hexagonal boron nitride is selected from a range of 3 to 6.

5. The friction lining according to claim 1, wherein the total proportion of solid lubricants in the friction lining body is selected from a range of 5 wt. % to 30 wt. %.

6. The friction lining according to claim 1, wherein the friction lining body contains tin sulfides as solid lubricants, wherein the total proportion of tin sulfides in the friction lining body amounts to between 2 wt. % and 7 wt. %.

7. The friction lining according to claim 1, wherein the friction lining body contains iron sulfides as solid lubricants, wherein the total proportion of iron sulfides in the friction lining body amounts to between 1 wt. % and 5 wt. %.

8. The friction lining according to claim 1, wherein the friction lining body contains hexagonal boron nitride as solid lubricants, wherein the total proportion of hexagonal boron nitride in the friction lining body amounts to between 1 wt. % and 6 wt. %.

9. The friction lining according to claim 1, wherein the solid lubricants are partly of a natural origin and partly synthetically produced, wherein a ratio of the solid lubricants of natural origin to the synthetically produced solid lubricants is selected from a range of 1.5 to 5.

10. The friction lining according to claim 9, wherein the proportion of synthetically produced solid lubricants in the friction lining body amounts to between 0.5 wt. % and 5 wt. %.

11. A friction component having a carrier on which a friction lining is arranged, wherein the friction lining is designed according to claim 1.

12. A friction assembly having at least one friction component, wherein the at least one friction component is designed according to claim 11 and wherein the friction assembly is a clutch or a brake.

13. A binder-free, sintered friction lining having a friction lining body, which comprises a metallic matrix, at least one abrasive, solid lubricants, and optionally a filling material, wherein the solid lubricants are formed by at least two different solid lubricants, which are selected from a group consisting of hexagonal boron nitride and metal sulfides with at least one metal from the group of tungsten, iron, tin, copper, bismuth, antimony, chromium, zinc, silver, manganese, and molybdenum, wherein the friction lining body contains SnS, FeS, and hexagonal boron nitride, and the solid lubricants include a synthetic solid lubricant based on zinc sulfide with tungsten sulfide and with graphite, wherein the proportion of SnS in the friction lining body amounts to between 2 wt. % and 6 wt. %, the proportion of FeS in the friction lining body amounts to between 1 wt. % and 3.5 wt. %, the proportion of hexagonal boron nitride in the friction lining body amounts to between 0.5 wt. % and 4 wt. % and the proportion of synthetic solid lubricant in the friction lining body amounts to between 0.5 wt. % and 3 wt. %.

14. A binder-free, sintered friction lining having a friction lining body, which comprises a metallic matrix, at least one abrasive, solid lubricants, and optionally a filling material, wherein the solid lubricants are formed by at least two different solid lubricants, which are selected from a group consisting of hexagonal boron nitride and metal sulfides with at least one metal from the group of tungsten, iron, tin, copper, bismuth, antimony, chromium, zinc, silver, manganese, and molybdenum, wherein the friction lining body contains SnS, hexagonal boron nitride, and graphite, and the solid lubricants include a synthetic solid lubricant based on zinc sulfide with tungsten sulfide and with graphite, wherein the proportion of SnS in the friction lining body amounts to between 4 wt. % and 8 wt. %, the proportion of hexagonal boron nitride in the friction lining body amounts to between 2 wt. % and 6 wt. %, the proportion of graphite in the friction lining body amounts to between 10 wt. % and 17 wt. % and the proportion of synthetic solid lubricant in the friction lining body amounts to between 0.5 wt. % and 3 wt. %.

\* \* \* \* \*